United States Patent
Kim et al.

(10) Patent No.: US 12,170,350 B2
(45) Date of Patent: Dec. 17, 2024

(54) LITHIUM SECONDARY BATTERY INCLUDING SEPARATOR WITH CERAMIC LAYER HAVING FIRST CERAMIC PARTICLE BONDED TO SECOND CERAMIC PARTICLE AND MANUFACTURING METHOD THE SAME

(71) Applicants: Hyundai Motor Company, Seoul (KR); Kia Corporation, Seoul (KR)

(72) Inventors: Dongjun Kim, Gyeonggi-do (KR); Yeol Mae Yeo, Gyeonggi-Do (KR); Yoon Sung Lee, Gyeonggi-do (KR); Jieun Lee, Gyeonggi-do (KR); Sang Mok Park, Gyeonggi-do (KR); Seung-Min Oh, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/668,973

(22) Filed: Feb. 10, 2022

(65) Prior Publication Data

US 2022/0166105 A1    May 26, 2022

Related U.S. Application Data

(62) Division of application No. 16/573,037, filed on Sep. 17, 2019, now Pat. No. 11,289,768.

(30) Foreign Application Priority Data

Dec. 13, 2018    (KR) .................. 10-2018-0161204

(51) Int. Cl.
*H01M 10/0525* (2010.01)
*H01M 50/417* (2021.01)
(Continued)

(52) U.S. Cl.
CPC ..... *H01M 10/0525* (2013.01); *H01M 50/434* (2021.01); *H01M 50/451* (2021.01);
(Continued)

(58) Field of Classification Search
CPC . H01M 50/411; H01M 50/403; H01M 50/449
(Continued)

(56) References Cited

U.S. PATENT DOCUMENTS

2005/0221165 A1* 10/2005 Hennige ............. H01M 50/451
429/251
2010/0330410 A1* 12/2010 Takahashi ............ H01M 4/139
429/129
(Continued)

FOREIGN PATENT DOCUMENTS

CN    104064709 A    9/2014
CN    107492620 A  * 12/2017
(Continued)

OTHER PUBLICATIONS

Celgard, Celgard® 2500 Monolayer Microporous Membrane, 2021 (Year: 2021).*

(Continued)

*Primary Examiner* — Sean P Cullen
(74) *Attorney, Agent, or Firm* — Fox Rothschild LLP

(57) ABSTRACT

Disclosed are a lithium secondary battery including: a positive electrode; a negative electrode; an electrolyte; and a separator including a separator substrate and a ceramic layer formed on one surface or both surfaces of the separator substrate. Particularly, the ceramic layer may include a first ceramic particle including an epoxide group and a second ceramic particle including an amine group, and the first ceramic particle may be chemically bonded to the second ceramic particle.

10 Claims, 4 Drawing Sheets

(51) Int. Cl.
*H01M 50/434* (2021.01)
*H01M 50/451* (2021.01)
*H01M 50/489* (2021.01)

(52) U.S. Cl.
CPC ........ *H01M 50/489* (2021.01); *H01M 50/417* (2021.01); *H01M 2220/20* (2013.01)

(58) Field of Classification Search
USPC .................................................. 429/144, 251
See application file for complete search history.

(56) References Cited

U.S. PATENT DOCUMENTS

| | | | | |
|---|---|---|---|---|
| 2013/0260207 | A1* | 10/2013 | Uemura | H01M 10/4235 521/134 |
| 2014/0186679 | A1 | 7/2014 | Archer et al. | |
| 2015/0295216 | A1 | 10/2015 | Okuno | |
| 2020/0083506 | A1* | 3/2020 | Herle | H01M 50/446 |

FOREIGN PATENT DOCUMENTS

| | | | |
|---|---|---|---|
| KR | 10-2005-0035281 A | 4/2005 | |
| KR | 10-2014-0070207 A | 6/2014 | |
| KR | 10-2014-0114359 A | 9/2014 | |
| KR | 1020150084116 A * | 7/2015 | ............ C07F 9/00 |
| WO | WO-2017222967 A2 * | 12/2017 | ............ C07F 9/00 |

OTHER PUBLICATIONS

Ko et al., Lithium Ion Battery Fabricated by Curable Copolyester/Alo Composite-Coated Nonwoven Poly(ehtylene terephthalate) Separator, 2017, Macromolecular Research, 25, 5-10 (Year: 2017).

Ko et al., "Curable polymeric binder-ceramic composite-coated superior heat-resistant polyethylene separator for lithium ion batteries", 2014, 4, 19229-19233 (Year: 2014).

Korean Office Action for Korean Patent Application No. 10-2018-0161204, dated Jul. 19, 2024, with English translation, 11 pages.

Korean Office Action for Korean Patent Application No. 10-2018-0161204, dated Sep. 19, 2024, with English translation, 11 pages.

* cited by examiner

○ : CERAMIC PARTICLE

✧ : POLYMER BINDER

LITHIUM SECONDARY BATTERY INCLUDING SEPARATOR WITH CERAMIC LAYER HAVING FIRST CERAMIC PARTICLE BONDED TO SECOND CERAMIC PARTICLE AND MANUFACTURING METHOD THE SAME

CROSS REFERENCE TO RELATED APPLICATION

This application is a Division of U.S. application Ser. No. 16/573,037, filed on Sep. 7, 2019, which is now U.S. Pat. No. 11,289,768 B2, is based on and claims priority under 35 U.S.C. § 119 to Korean Patent Application No. 10-2018-0161204, filed on Dec. 13, 2018 in the Korean Intellectual Property Office, the disclosure of which is incorporated herein by reference.

TECHNICAL FIELD

The present invention relates to a lithium secondary battery and a manufacturing method thereof.

BACKGROUND

In general, a lithium secondary battery containing an electroactive substance has a higher operating voltage and a higher energy density compared to a lead battery or a nickel/cadmium battery. Accordingly, lithium secondary batteries have been used as energy storage devices for electric vehicles (EVs) and hybrid electric vehicles (HEVs).

In the related art, stability of a separator of a lithium secondary battery has been an important issue for commercialization of electric vehicles and is determined by an amount and a type of a ceramic layer formed on a separator substrate. Therefore, a process of coating the separator substrate with a ceramic material is very important.

A separator ceramic layer that has been currently used can be prepared by a method of physically combining ceramic particles with a polymer binder.

However, relatively weak binding force is obtained by such an approach. In addition, when a molecular weight of the polymer binder is increased in order to increase the binding force, a coating solution becomes difficult to manufacture, and an amount of the ceramic particles relatively decreases. Accordingly, cell resistance is increased and it is difficult to secure the output characteristics. Accordingly, it is necessary to develop a lithium secondary battery capable of solving the above-mentioned problems.

SUMMARY

In preferred aspects, provided are a lithium secondary battery including a binder-free ceramic coating separator that does not use or include a binder and a method of manufacturing the same. For example, the binder-free ceramic coating separator may include ceramic particles modified to form a chemical bonding therebetween.

In one aspect, provided is a lithium secondary battery that may include: a positive electrode; a negative electrode; an electrolyte; and a separator comprising a separator substrate and a ceramic layer formed on one surface or both surfaces of the separator substrate. I particular, the ceramic layer comprises a first ceramic particle comprising epoxide groups and a second ceramic particle comprising amine groups, and Wherein the first ceramic particle chemically bonded to the second ceramic particle.

Thus, for instance, an epoxide group of a first ceramic particle may be reacted and be a constituent or component of a chemical bond with the second chemical particle. An amine group of a second ceramic particle group may be reacted and be a constituent or component be a constituent or component of a chemical bond with the first chemical particle. In certain aspects, an epoxide group of the first ceramic particle may be reacted and form a linkage together with a reacted amine of a second ceramic particle.

In certain preferred aspects, the first ceramic particle comprises one or more epoxy groups or reacted epoxide groups and the second ceramic particle comprises one or more amine groups or reacted amine groups.

Also, the ceramic layer may suitably have a variety of thicknesses including a thickness of about 0.5 to 2 μm.

Also, each of the first ceramic particle and the second ceramic particle may each have a variety of diameters and suitably each may have a diameter of about 0.05 to 1.5 μm.

Also, each of the first ceramic particle and the second ceramic particle may suitably include one or more selected from the group consisting of $Al_2O_3$, $TiO_2$, $BaTiO_3$, $Li_2O$, $BaO$, $Na_2O$, $Li_2CO_3$, $CaCO_3$, $CaO$, $LiAlO_2$, $SiO_2$, $SiO$, $SnO$, $SnO_2$, $PbO_2$, $ZnO$, $P_2O_5$, $CuO$, $MoO$, $MgO$, $V_2O_5$, $Y_2O_3$, $B_2O_3$, $CeO_2$, $Mn_3O_4$, $Sn_2P_2O_7$, $Sn_2B_2O_5$, $Sn_2BPO_6$, $Al(OH)_3$, $Mg(OH)_2$ and $\gamma$-AlO(OH).

Also, each of the first ceramic particle and the second ceramic particle may be modified, for example, grafted by ester bonding with a first organic material and a second organic material, respectively.

The term "graft" or "grafted" as used herein refers to being modified, for example, on a surface or outer or inner motif, to include additional or foreign material, which may be attached reversibly or irreversibly via chemical reaction or bond formation. In certain embodiments, the grafted compound or material may include the additional or foreign compound or material, which are attached via chemical reaction and/or via covalent bond, on the surface of the ungrafted compound or material. The functional groups involved in the grafted material may include reactive groups subjected for chemical reaction (e.g., bond formation).

In another aspect, provided is a method of manufacturing a lithium secondary battery. The method may include: forming first ceramic particles by grafting a first organic material onto the surface of first ceramic particles; forming second ceramic particles grafting a second organic material onto the surface of second ceramic particles; coating the first ceramic particles and the second ceramic particles on one surface or both surfaces of a separator substrate; and heat-treating the first ceramic particles and the second ceramic particles so as to form crosslinking between the first ceramic particles and the second ceramic particles. The first ceramic particles and the second ceramic particles may be the same or different materials including the ceramic materials (e.g., $Al_2O_3$, $TiO_2$, $BaTiO_3$, $Li_2O$, $BaO$, $N_2O$, $Li_2CO3$, $CaCO_3$, $CaO$, $LiAlO_2$, $SiO_2$, $SiO$, $SnO$, $SnO_2$, $PbO_2$, $ZnO$, $P_2O_5$, $CuO$, $MoO$, $MgO$, $V_2O_5$, $Y_2O_3$, $B_2O_3$, $CeO_2$, $Mn_3O_4$, $Sn_2P_2O_7$, $Sn_2B_2O_5$, $Sn_2BPO_6$, $Al(OH)_3$, $Mg(OH)_2$ and $\gamma$-AlO(OH)) as described herein. Preferably, the first ceramic particles and the second ceramic particles may be made from the same material.

For example, the method may include preparing a coating compositing including the first ceramic particles, the second ceramic particles and a solvent component and the coating composition may be prepared by dispersing the first ceramic particles and the second ceramic particles in the solvent component. Preferably, the coating composition may be formed in a slurry.

The ceramic particles may suitably include one or more selected from the group consisting of $Al_2O_3$, $TiO_2$, $BaTiO_3$, $Li_2O$, $BaO$, $Na_2O$, $Li_2CO3$, $CaCO_3$, $CaO$, $LiAlO_2$, $SiO_2$, $SiO$, $SnO$, $SnO_2$, $PbO_2$, $ZnO$, $P_2O_5$, $CuO$, $MoO$, $MgO$, $V_2O_5$, $Y_2O_3$, $B_2O_3$, $CeO_2$, $Mn_3O_4$, $Sn_2P_2O_7$, $Sn_2B_2O_5$, $Sn_2BPO_6$, $Al(OH)_3$, $Mg(OH)_2$ and $\gamma$-AlO(OH).

The first organic material may suitably include a carboxyl (e.g. —COOH) group and/or an epoxide group, and the second organic material may suitably include a carboxyl group and/or an amine group.

The first organic material may suitably include one or more selected from the group consisting of glycidic acid, 3-(2-carboxyethenyl)oxirane-2-carboxylic acid, 2-(carboxymethyl)oxirane-2-carboxylic acid, (trifluoromethyl) oxirane-2-carboxylic acid, and 3-methyl-3-sec-butyl-oxirane-2-carboxylic acid, and the second organic material may suitably include one or more selected from the group consisting of aspartic acid, 2-aminopentanedioic acid, serine, asparagine, and 2-(methylamino)butanedioic acid.

The the first ceramic particles and the second ceramic particles may be coated by chemical vapor deposition (CVD), physical vapor deposition (PVD), sputtering, arc discharge, or a combination thereof.

The heat-treating may be performed at a temperature of about 120° C. or greater.

The first and second ceramic particles may be prepared by treatment with an acid.

The acid may suitably include one or more selected from the group consisting of hydrochloric acid, sulfuric acid, nitric acid, and trifluoroacetic acid (TFA).

The manufacturing method of the lithium secondary battery may further include a step of drying the first ceramic particles and the second ceramic particles.

Alternatively, the method may further include preparing a coating composition including the first ceramic particles, the second ceramic particles and a solvent component, for example, by dispersing the first ceramic particles and the second ceramic particles in the solvent component. The coating composition including the first ceramic particles and the second ceramic particles may be coated on the one surface or both surfaces of the separator substrate. For example, by the step of drying, the solvent component in the coating composition may be removed.

Also provided is a vehicle comprising the lithium secondary battery as described herein.

The lithium secondary battery according to the various exemplary embodiments may have improved adhesion between the ceramic particles by utilizing chemical bonding, thereby reducing the amount of the polymer binder and assuring the price competitiveness of the lithium secondary battery.

DETAILED DESCRIPTION

Figure 1A:
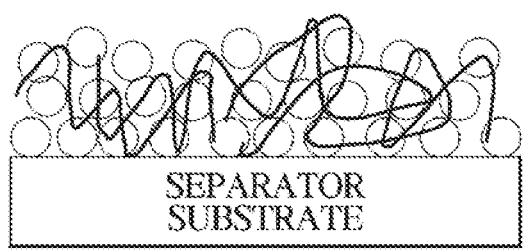
FIG. 1A shows cross-sectional views of a conventional ceramic coating layer and FIG. 1B shows an exemplary ceramic coating layer introduced according to an exemplary embodiment of the present invention.

Like reference numerals refer to like elements throughout this specification. This specification does not describe all components of embodiments, and general information in the technical field to which the present invention belongs or overlapping information between the embodiments will not be described.

Throughout the specification, when a section is referred to as "containing" an element, it means this does not exclude other components unless specifically stated to the contrary, but may include other components.

As used herein, the singular forms "a," "an" and "the" are intended to include the plural forms as well, unless the context clearly indicates otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings and tables. An exemplary binder-free ceramic coating separator according to an exemplary embodiment will be described in detail after describing a lithium secondary battery.

Lithium secondary batteries generally include a positive electrode, a negative electrode, a separator, and an electrolyte. The positive electrode, the negative electrode, and the electrolyte may be those conventionally used in the production of lithium secondary batteries.

The electrode may be formed by applying an electrode slurry, in which an electrode active material, a conductive material, a solvent, and a binder are mixed, to a predetermined thickness on an electrode current corrector, followed by drying and rolling.

The electrode current corrector is not particularly limited as long as it has high conductivity without causing chemical change in the lithium secondary battery. For example, stainless steel, aluminum, nickel, titanium, sintered carbon, or aluminum or stainless steel surface-treated with carbon, nickel, titanium, silver or the like may be used as the electrode current corrector. It is possible to form fine irregularities on the surface of the current collector to increase the adhesive force of the positive electrode active material or to form various forms such as a film, a sheet, a foil, a net, a porous structure, a foam, and a nonwoven fabric.

The negative electrode active material used for manufacturing the negative electrode may be any active material capable of intercalating or deintercalating lithium ions. The negative electrode active material may be formed of any one or a combination of two or more materials selected from the group consisting of a material capable of reversibly intercalating and deintercalating lithium, a metal material alloyable with lithium, and a mixture thereof.

The materials capable of reversibly intercalating or deintercalating lithium may include at least one selected from the group consisting of artificial graphite, natural graphite, graphitized carbon fibers, graphitized mesocarbon microbeads, fullerene, and amorphous carbon.

Amorphous carbon may include hard carbon, coke, MCMB and MPCF calcined at a temperature of 1500° C. or less. Also, the metal alloyable with lithium may include at least one metal selected from the group consisting of Al, Si, Sn, Pb, Zn, Bi, In, Mg, Ga, Cd, Ni, Ti, Mn and Ge. These metal materials may be used alone or as a mixture or alloy. In addition, the metal material may be used as a composite material mixed with a carbon-based material.

The negative electrode active material may include silicon. It may also include a graphite-silicon composite. The negative electrode active material containing silicon refers to a negative material including silicon oxide, silicon particles, silicon alloy particles, and the like. Representative examples of the alloys include solid solutions of aluminum (Al), manganese (Mn), iron (Fe), titanium (Ti), or the like in silicon, intermetallic compounds and eutectic alloys, but are not limited thereto.

The positive electrode active material includes a compound capable of reversibly intercalating or deintercalating lithium. Specifically, at least one of complex oxides of lithium and a metal selected from cobalt, manganese, nickel, and any combination thereof may be used as the positive electrode active material.

The conductive material is used for improving the electrical conductivity. The conductive material is not particularly limited as long as it is an electroconductive material that does not cause chemical change in the lithium secondary battery. For example, graphite such as natural graphite or artificial graphite; carbon black such as acetylene black, KETJEN BLACK®, channel black, furnace black, lamp black, and thermal black; conductive fibers such as carbon fiber and metal fiber; metal powders such as carbon fluoride, aluminum, and nickel powder; conductive whisker such as zinc oxide and potassium titanate; conductive metal oxides such as titanium oxide; conductive materials such as polyphenylene derivatives and the like may be used.

As a binder, an aqueous binder such as carboxymethyl cellulose (CMC) and styrene-butadiene rubber (SBR) may be used for the negative electrode and polyvinylidene fluoride (PVDF) may be used in the positive electrode.

The electrodes according to an exemplary embodiments may further include other components such as a dispersion medium, a viscosity modifier, and a filler as additives in addition to the electrode active material, the conductive material, and the binder described above.

The electrolytic includes a lithium salt and a non-aqueous organic solvent and may further include additives for improving charge/discharge characteristics, preventing overcharge, and the like. Examples of the lithium salt include any one or a combination of two or more materials selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_4)_4$, $Li(SO_2F)_2N$ (LiFSI) and $(CF_3SO_2)_2NLi$.

As the non-aqueous organic solvent, carbonate, ester, ether, or ketone may be used alone or in combination. Examples of the carbonate include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC), fluoroethylene carbonate (FEC), vinylene carbonate (VC), and the like may be used. As the ester, γ-butyrolactone (GBL), n-methyl acetate, n-ethyl acetate, n-propyl acetate, and the like may be used and as the ether, dibutyl ether and the like may be used, but are not limited thereto.

The non-aqueous organic solvent may further include an aromatic hydrocarbon organic solvent. Specific examples of the aromatic hydrocarbon organic solvent include benzene, fluorobenzene, bromobenzene, chlorobenzene, cyclohexylbenzene, isopropylbenzene, n-butylbenzene, octylbenzene, toluene, xylene, mesitylene, and the like, which is used alone or in combination.

A separator is provided for providing a path for lithium ion migration in the lithium secondary battery and physically separating the two electrodes from each other, and the separator is not particularly limited as long as it is used as a separator material in a lithium secondary battery. Particularly, it is preferable that the separator has low resistance against ion migration of the electrolyte and excellent electrolyte retaining capability.

For example, the separator substrate may be a conventional porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, used alone or in a stacked structure.

In the related art, a ceramic coated separator (CCS) has been applied to a lithium secondary battery.

The ceramic coating layer may be a coating layer for enhancing the safety of a lithium secondary battery by preventing a short circuit between a positive electrode and a negative electrode on an active material layer of the positive electrode or the negative electrode, for example, when there is a problem in the separator that prevents self-discharge via ion exchange between the positive electrode and the negative electrode.

A conventional coating composition for forming such a ceramic coating layer typically includes a ceramic powder having excellent electrical insulation properties, a polymer binder for imparting a bonding force between the particles constituting the ceramic powder when applied, and a liquid dispersion medium for dispersing the ceramic powder.

The lithium secondary battery according to exemplary embodiments of the present invention may include a binder-free ceramic coating separator in order not to use a polymer binder. In other words, the ceramic coating separator may not include a binder, a polymer binder, or a polymeric resin. Bonding or adherence between ceramic particles in the ceramic coating may be realized through chemical bonding between ceramic particles having an epoxide group and ceramic particles having an amine group ($—NH_2$). Details thereof will be described later.

When a conventional ceramic coating separator is manufactured, a slurry is prepared by mixing a polymer binder and ceramic particles in a specific solvent and coated on a separator substrate. Since the binder physically holds the ceramic particles, the ratio of the binder cannot be lowered to a certain level or less. Furthermore, since the uniformity of the coating layer may be affected by the state of the slurry, a change with time that causes a side reaction may occur.

Generally, when the molecular weight of the polymeric binder is increased to improve a binding force between the ceramic particles, the slurry (coating solution) is not easily produced, cell resistance increases, and migration of lithium ions cannot be secured, thereby deteriorating output characteristics.

The various exemplary embodiments may provide a secondary battery having improved adhesion between ceramic particles. Particularly, the ceramic particles may be bonded to each other via chemical bonds, e.g., covalent bonding, between functional groups attached or grafted on the surface of each of ceramic particles. For instance, the functional groups on the ceramic particles may include heterogeneous functional groups or different functional groups which may participate in chemical reaction to form a covalent bond.

Hereinafter, a binder-free ceramic coating separator of a lithium secondary battery according to the exemplary embodiments will be described in detail.

The lithium secondary battery according to an exemplary embodiment includes a positive electrode, a negative electrode, an electrolyte, and a separator including a separator substrate and a ceramic layer formed on one surface or both surfaces of the separator substrate.

Figure 1B:
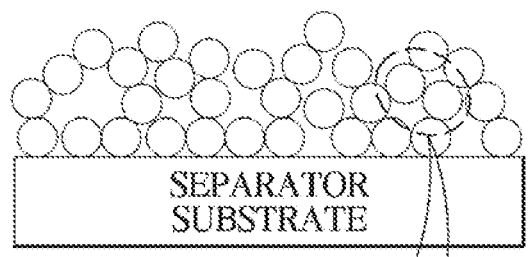
Figure 1B:
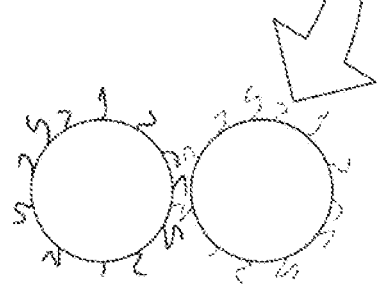

FIG. 1A shows cross-sectional views of a conventional ceramic coating layer and FIG. 1B shows an exemplary ceramic coating layer introduced according to an exemplary embodiment of the present invention.

As shown in FIG. 1A, the conventional separator ceramic layer has a porous structure having a plurality of micropores formed by interstitial volumes of ceramic particles. At this time, ceramic particles are physically bonded to each other using a polymer binder. Specifically, the ceramic particles are fixed to each other by point bonding and/or surface bonding between particles via a binder polymer resin.

In contrast, as shown in FIG. 1B, the binder-free ceramic layer of the present invention may be prepared via chemical bonding (e.g., covalent bonding) between first ceramic particles including an epoxide group and second ceramic particles including an amine group.

The epoxide group and the amine group may be functional groups introduced (e.g., attached or grafted on the surface of the ceramic particles) to cause a chemical reaction between the ceramic particles.

The ceramic layer may be formed to have a thickness of about 0.5 to 2 μm in order to secure the thermal stability of the electrode and the separator and not to affect the output characteristics of the lithium secondary battery. When the thickness of the ceramic layer is less than about 0.5 μm, the thermal stability of the separator may be deteriorated or weakend, and when the thickness of the ceramic layer is greater than about 2 μm, there arises a problem that the capacity and output of the lithium secondary battery may be reduced as the internal resistance increases.

The size of the ceramic particles is not limited, but it is preferable that a diameter of each of the ceramic particles is within a range of about 0.05 to 2 μm in order to secure the porosity of the ceramic layer. Here, when the diameters of the ceramic particles are less than about 0.05 μm, the dispersibility is lowered and it is difficult to prepare a uniform coating solution. When the diameters of the ceramic particles is greater than about 2 μm, the pores formed in the ceramic layer may be reduced and impregnability of the electrolytic is lowered.

Also, the ceramic particles may include one or more selected from the group consisting of $Al_2O_3$, $TiO_2$, $BaTiO_3$, $Li_2O$, $BaO$, $Na_2O$, $Li_2CO3$, $CaCO_3$, $CaO$, $LiAlO_2$, $SiO_2$, $SiO$, $SnO$, $SnO_2$, $PbO_2$, $ZnO$, $P_2O_5$, $CuO$, $MoO$, $MgO$, $V_2O_5$, $Y_2O_3$, $B_2O_3$, $CeO_2$, $Mn_3O_4$, $Sn_2P_2O_7$, $Sn_2B_2O_5$, $Sn_2BPO_6$, $Al(OH)_3$, $Mg(OH)_2$ and $\gamma$-$AlO(OH)$, but the ceramic particles are not limited thereto as long as they may realize electrical insulation capable of preventing short circuits between the positive electrode and negative electrode constituting the lithium secondary battery.

At this time, for reactions between the grafted functional groups on the first ceramic particles and the second ceramic particles, a reaction between an epoxide group and an amine group may occur. A crosslinking reaction between the epoxide group and the amine group may proceed even with a low energy. For example, the crosslinking reaction may proceed under a temperature condition of about 100° C. or greater.

Further, each of the first ceramic particles and the second ceramic particles may suitably include an ester group (—COO) to graft the epoxide group and the amine group onto the surfaces thereof, respectively.

Hereinafter, a method of manufacturing a binder-free ceramic coating separator according to the various exemplary embodiments will be described.

The method of manufacturing a lithium secondary battery according to an exemplary embodiment may include: forming first ceramic particles by grafting a first organic material onto the surface of the ceramic particles; forming second ceramic particles by grafting a second organic material onto the surface of the ceramic particles; coating the first ceramic particles and the second ceramic particles on one surface or both surfaces of a separator substrate; and heat-treating the first ceramic particles and the second ceramic particles so as to form crosslinking between the first ceramic particles and the second ceramic particles.

Different types of organic materials may be grafted onto ceramic particles having hydroxyl groups (—OH) on the surfaces thereof. Hereinafter, the organic materials will be referred to as a first organic material and a second organic material.

The surfaces of the ceramic particles may be treated with an acid (e.g. strong acid having a pKa less than −1 or −2 in water) to increase the number of hydroxyl groups on the surfaces of the ceramic particles. A strong acid may be preferably used and the exemplary strong acid may include one selected from the group consisting of hydrochloric acid, sulfuric acid, nitric acid, trifluoroacetic acid (TFA), and a combination thereof.

Figure 2:
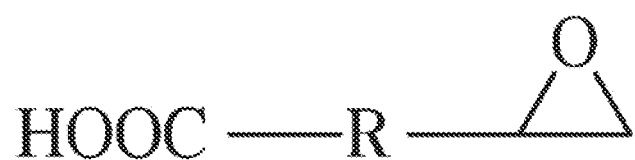
FIG. 2 illustrates an exemplary first organic material including a carboxyl group and an epoxide group according to an exemplary embodiment of the present invention.

FIG. 2 illustrates an exemplary first organic material including a carboxyl group and an epoxide group according to an exemplary embodiment of the present invention.

Figure 3:
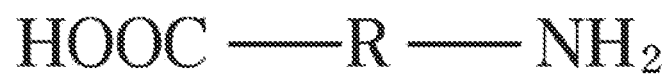
FIG. 3 illustrates an exemplary second organic material including a carboxyl group and an amine group according to an exemplary embodiment of the present invention.

FIG. 3 illustrates an exemplary second organic material including a carboxyl group and an amine group according to an exemplary embodiment of the present invention.

As shown in FIGS. 2 and 3, the first organic material may preferably include a carboxyl group and an epoxide group, and the second organic material may preferably include a carboxyl group and an amine group.

The first organic material may suirably include one or more selected from the group consisting of glycidic acid, 3-(2-carboxyethenyl)oxirane-2-carboxylic acid, 2-(carboxymethyl)oxirane-2-carboxylic acid, (trifluoromethyl) oxirane-2-carboxylic acid, and 3-methyl-3-sec-butyl-oxirane-2-carboxylic acid. Also, the second organic material may suitably include one or more selected from the group consisting of aspartic acid, 2-aminopentanedioic acid, serine, asparagine, and 2-(methylamino)butanedioic acid. The first organic material and the second organic material are not limited to the above materials as long as they are substances capable of bonding with ceramic particles.

For example, the hydroxyl group of the ceramic particles may react with the carboxyl group to form an ester bond (—COO—). By applying such a reaction, an organic substance containing a carboxyl group may be grafted onto the surfaces of the ceramic particles.

The first organic material and the second organic material may react with the ceramic particles under certain conditions to form the first ceramic particles or the second ceramic particles including an epoxide group or an amine group.

Preferably, the ceramic particles may be dispersed in a solvent component in which each organic material may be dissolved. At this time, it is preferable to adjust the molar ratio of the hydroxyl group of the ceramic particles to the carboxyl group of the organic material to 1:1.

At this time, the solvent component as used herein may have excellent solubility with respect to the first organic material or the second organic material and have non-solvent characteristics with respect to the separator substrate. Suitably examples thereof may include acetone, tetrahydrofuran, acetonitrile, dimethylformamide, dimethylsulfoxide, dimethylacetamide, N-methylpyrrole or water, which may be used in a mixture of two or more thereof.

Figure 4:
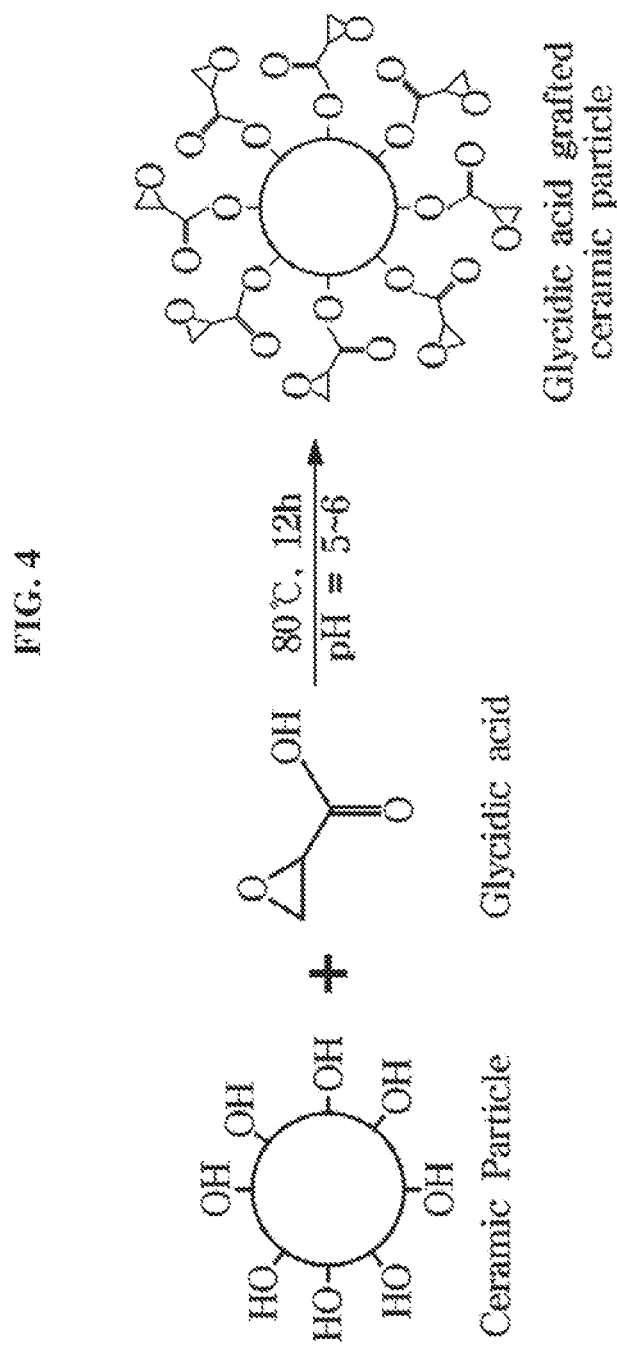
FIGS. 4 and 5 are views showing an exemplary process of manufacturing ceramic particles grafted with exemplary organic materials according to an exemplary embodiment of the present invention.
Figure 5:
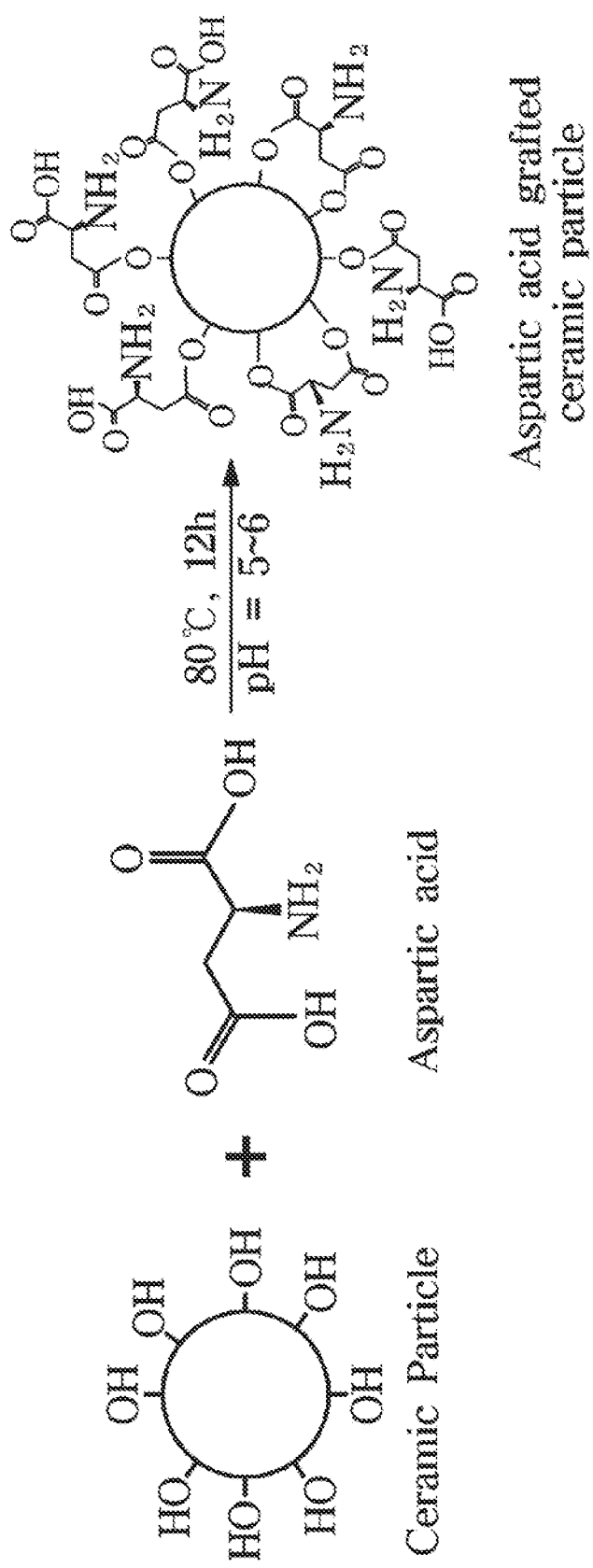

FIGS. 4 and 5 are views showing an exemplary process of manufacturing ceramic particles grafted with organic materials according to an embodiment of the present invention. In this regard, the first organic material may suitably include glycidic acid and the second organic material suitably include aspartic acid.

As shown in FIG. 4, when the hydroxyl group of the ceramic particle and the carboxyl group of glycidic acid, which is the first organic material, are bonded to each other, the first ceramic particle grafted with the first organic material may be manufactured. Since the first organic material includes an epoxide group (triangular shape), an epoxide group may be formed on the surface of the first ceramic particle as a result.

As shown in FIG. 5, when the hydroxide group of the ceramic particle and the carboxyl group of the aspartic acid, which is the second organic material, may be bonded to each other, the second ceramic particle grafted with the second organic material is manufactured. Since the second organic material contains an amine group, an amine group may be provided on the surface of the second ceramic particle as a result.

At this time, ester polymerization reaction between the ceramic particle, and the second organic material and in the second organic material may be performed for about 12 hours at a temperature of about 80° C. or higher at a pH of about 5 to 6.

Next, the first ceramic particles and the second ceramic particles may be washed using a solvent to remove unreacted residues.

One surface of a separator substrate may be coated with the slurry in which the first ceramic particles and the second ceramic particles synthesized as described above may be dispersed in a solvent, and the coated slurry may be heat-treated and dried to prepare a ceramic coating separator.

A coating method of the first ceramic particles and the second ceramic particles may be chemical vapor deposition (CVD), physical vapor deposition (PVD), sputtering, arc discharge, or a combination thereof.

Next, the first ceramic particles and the second ceramic particles may be subjected to a heat treatment process for chemically crosslinking.

Figure 6:
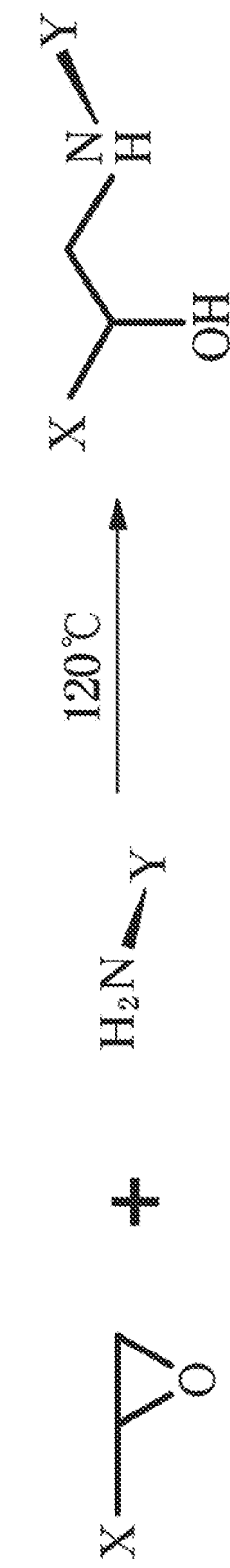
FIG. 6 shows an exemplary reaction process between ceramic particles grafted with different organic materials according to an exemplary embodiment of the present invention.

FIG. 6 shows an exemplary reaction process between ceramic particles grafted with different organic materials according to an exemplary embodiment of the present invention.

As shown in FIG. 6, when the epoxide group of the first ceramic particle and the amine group of the second ceramic particle may be reacted, the epoxide ring may be loosened to cause crosslinking therebetween.

The heat treatment process may be performed by heating in a state that the separator substrate may be coated with the slurry. For example, the chemical reaction between the first ceramic particles and the second ceramic particles may proceed under a temperature condition of about 120° C. or greater.

Subsequently, the ceramic coated separator may be dried and rolled to produce a final separator. The drying may include removing the solvent component included in the slurry or the coating composition. The lithium secondary battery according to the various exemplary embodiments may have an improved bonding force of the ceramic layer by introducing a binder-free ceramic coating separator thereinto without using a binder in the ceramic coating of the separator. Thus, the lithium secondary battery according to the various exemplary embodiments may have excellent slurry stability, ease of manufacture, and excellent output characteristics by reducing the amount of the binder.

Exemplary embodiments of the present invention have been described above with reference to the accompanying drawings. Those skilled in the art will appreciate that these inventive concepts may be embodied in different forms without departing from the scope and spirit of the invention. The disclosed embodiments have been described for illustrative purposes and not for limiting purposes.

What is claimed is:

1. A method of manufacturing a lithium secondary battery comprising a ceramic coating separator, the method comprising:
    coating first ceramic particles and second ceramic particles on one or both surfaces of a separator substrate, wherein the first ceramic particles comprise an epoxide group, and the second ceramic particles comprise an amine group; and
    heat-treating the first ceramic particles and the second ceramic particles so as to form crosslinking between the epoxide group of the first ceramic particles and the amine group of the second ceramic particles to form a binder-free ceramic layer on said one or both surfaces of the separator substrate, thereby forming the ceramic coating separator,
    wherein ceramic coating separator is binder-free.

2. A method of manufacturing a lithium secondary battery comprising a ceramic coating separator, the method comprising:
    forming first ceramic particles by grafting a first organic material comprising an epoxide group onto a surface of first ceramic material particles;
    forming second ceramic particles by grafting a second organic material comprising an amine group onto a surface of second ceramic material particles;
    coating first ceramic particles and second ceramic particles on one or both surfaces of a separator substrate; and heat-treating the first ceramic particles and the second ceramic particles so as to form crosslinking between the epoxide group of the first ceramic particles and the amine group of the second ceramic particles to form a binder-free ceramic layer on said one or both surfaces of the separator substrate, thereby forming the ceramic coating separator, wherein the ceramic coating separator is binder-free.

3. A method of manufacturing a lithium secondary battery, the method comprising:

forming first ceramic particles by grafting a first organic material onto a surface of first ceramic material particles;

forming second ceramic particles by grafting a second organic material onto a surface of second ceramic material particles;

coating the first ceramic particles and the second ceramic particles on one or both surfaces of a separator substrate to form a ceramic coating separator; and heat-treating the first ceramic particles and the second ceramic particles so as to form crosslinking between the first ceramic particles and the second ceramic particles, wherein the ceramic coating separator is binder-free, wherein the first organic material comprises a carboxyl group and an epoxide group, and the second organic material comprises a carboxyl group and an amine group, and wherein a binder-free ceramic layer is prepared via chemical bonding between the first ceramic particles including the epoxide group and the second ceramic particles including the amine group.

4. The method of claim 3, wherein the first organic material comprises one or more selected from the group consisting of glycidic acid, 3-(2-carboxyethenyl) oxirane-2-carboxylic acid, 2-(carboxymethyl) oxirane-2-carboxylic acid, (trifluoromethyl) oxirane-2-carboxylic acid, and 3-methyl-3-sec-butyl-oxirane-2-carboxylic acid, and the second organic material comprises one or more selected from the group consisting of aspartic acid, 2-aminopentanedioic acid, serine, asparagine, and 2-(methylamino) butanedioic acid.

5. The method of claim 3, wherein the heat-treating is performed at a temperature of about 120° C. or greater.

6. The method of claim 3, wherein the first ceramic material particles and the second ceramic material particles comprise one or more selected from the group consisting of $Al_2O_3$, $TiO_2$, $BaTiO_3$, $Li_2O$, $BaO$, $Na_2O$, $Li_2CO_3$, $CaCO_3$, $CaO$, $LiAlO_2$, $SiO_2$, $SiO$, $SnO$, $SnO_2$, $PbO_2$, $ZnO$, $P_2O_5$, $CuO$, $MoO$, $MgO$, $V_2O_5$, $Y_2O_3$, $B_2O_3$, $CeO_2$, $Mn_3O_4$, $Sn_2P_2O_7$, $Sn_2B_2O_5$, $Sn_2BPO_6$, $Al(OH)_3$, $Mg(OH)_2$ and $\gamma$-$AlO(OH)$.

7. The method of claim 3, wherein the first ceramic particles and the second ceramic particles are coated by chemical vapor deposition (CVD), physical vapor deposition (PVD), sputtering, arc discharge, or a combination thereof.

8. The method of claim 3, further comprising drying the first ceramic particles and the second ceramic particles.

9. The method of claim 3, wherein the first ceramic particles and second ceramic particles are prepared by treatment with an acid.

10. The method of claim 9, wherein the acid comprises one or more selected from the group consisting of hydrochloric acid, sulfuric acid, nitric acid, and trifluoroacetic acid (TFA).

* * * * *